G. VON POST.
READING DEVICE FOR SCALES.
APPLICATION FILED AUG. 28, 1920.
1,396,607.
Patented Nov. 8, 1921.
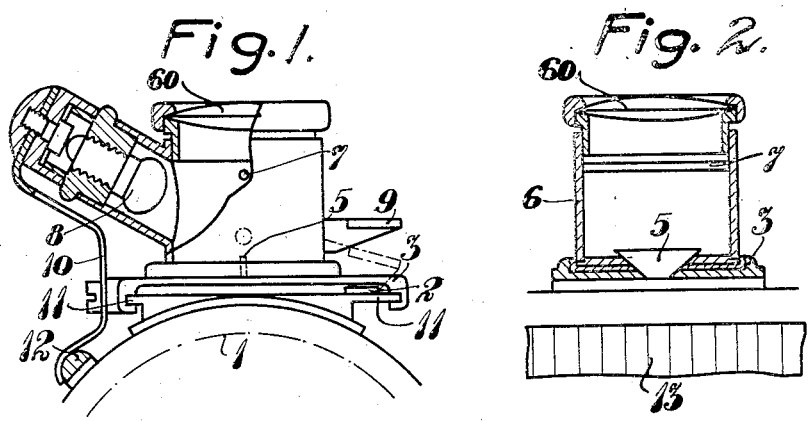
Inventor
Gustaf von Post
by Henry Orth
Atty

UNITED STATES PATENT OFFICE.

GUSTAF VON POST, OF NEW YORK, N. Y.

READING DEVICE FOR SCALES.

1,396,607.

Specification of Letters Patent. Patented Nov. 8, 1921.

Application filed August 28, 1920. Serial No. 406,600.

*To all whom it may concern:*

Be it known that I, GUSTAF VON POST, a subject of the King of Sweden, residing at New York city, New York, have invented new and useful Reading Devices for Scales, of which the following is a specification.

This invention relates to reading devices for automatic weighing and computing scales.

In weighing and computing scales in which the computation or product numeral searched for is indicated by means of a pointer or in some other way on a graduated drum or dial, having a plurality of columns of numerals it has proved very confounding to the eye and thus time-wasting to find the correct numeral with the means as heretofore used for this purpose and thus reading errors will often occur.

This invention has for its purpose to completely overcome said difficulty by providing the scale with a member adjustable relatively to a row of numerals indicating different prices per unit which are printed on a stationary portion of the scale, and when so adjusted said member will move across the product columns printed on the movable portion of the indicating mechanism of the scale, said member having an index which, when the member is set on a definite price per unit, will point at the product column corresponding to said price. Preferably, the said movable member is in the form of a slide having a rectangular opening in it said opening forming the index above referred to.

The reading of the wanted numeral of the column selected may take place in the usual way by the aid of a fixed line extending across all of the columns or by some other appropriate means.

In the preferred form of the invention, I may use to this end an additional index on the said movable member, said index comprising, for instance, a filament or a pointer. With such an additional index the said line extending across all of the columns may be omitted.

In the accompanying drawing, Figure 1 is an elevation, partly in section, of an embodiment of the apparatus according to this invention. Fig. 2 is a section at right angles to Fig. 1 of the said last mentioned apparatus. Fig. 3 shows the apparatus as applied to an automatic scale of well known construction having an indicating drum.

In the drawing, the numeral 1 indicates the graduated drum upon which are printed computation numbers corresponding to the products of the weight and certain prices per unit inscribed on the scale 2. 3 is a slide or chariot having an oblong slot 4 formed in it the width of said slot corresponding to the columns 13 on the drum 1 containing the numbers corresponding to the products of the weight and prices per unit. 5 is a hair pointer arranged on the slide 3 so as to coincide with the zero line of the drum when the scale is unloaded. In Figs. 3 and 4 I have shown, how the slide 3 is combined with a tube 6 containing a magnifying glass 60 said tube for the purpose of obviating parallax in the reading being also provided with a hair pointer 7 so placed that the sighting line between the hair pointers 5 and 7 will in the unloaded state of the scale coincide with the zero line of the drum 1. A lamp 8 is so arranged as to illuminate the drum 1 through the slot 4. The lamp may, preferably, be an electric lamp the lighting and extinguishing of which may be effected by means of an interrupter of well known construction or, as shown, by an interrupter in the shape of a key 9. 10 is a sliding contact connected with the slide and bearing against a rib 12 parallel with the guide-ways 11 while insulated therefrom. The said rib is connected to one terminal of a source of current (not shown) the opposite terminal of which is connected to the frame of the scale, said last mentioned connection preferably containing an interrupter.

In operation, the slide 3 is so adjusted that the unit price desired appears through the slot 4. The goods to be weighed are then placed on the scale pan and the computation number searched for, that is the price of the goods, may be read on the drum 1 along the sighting line determined by the hair pointers 5 and 7.

Having thus described my invention, what I claim is:—

1. In a weighing device having a scale with unit prices marked thereon, and a member rotatable with respect to said scale, having series of products of weight and price, each series registrable with a unit price indication on said scale, in combination with a reading slide movable along said scale having a reading opening therein of substantially the same width as a series and a price indicating division, a zero indicator carried by said slide and a parallax indicator coöperating with said zero indicator, whereby said slide and its indicators are slidable into reading position along said scale and across the series on said rotatable member co-acting with said scale.

2. In a computing weighing device, the combination with a rotary computing member and a unit price scale coöperating therewith; of a slide movable along said scale having a lens, a zero hair, a parallax hair, an electric lamp carried by said slide, an electrical contact rail and an electrical contact sliding thereon for supplying current to said lamp at any position of said slide.

3. In a computing weighing device, the combination with a rotary computing member and a units price scale coöperating therewith; of a slide movable along said scale having a lens, a zero hair, a parallax hair, an electric lamp carried by said slide, an electrical contact rail, an electrical contact sliding thereon for supplying current to said lamp at any position of said slide, and a circuit making device comprising a key carried by said slide to cause current supply to said lamp when said key is depressed at the moment of reading said member.

4. In a weighing device a horizontal rotatable drum having series of products of rate and weight thereon, and a straight scale having units prices, divisions thereon registering with corresponding series on said drum; in combination with a slide longitudinally movable over said scale and having an opening of substantially the width of a scale division, a zero hair at said opening, a parallax hair above said zero hair, a lens whose optical axis passes substantially through both hairs, an electric lamp arranged laterally of said axis to illumine both hairs and opening an electrical contact rail parallel with said scale, a contact slidable on said rail, and supplying current to said lamp, and a key to effect illumination of the lamp when the slide is in any position along said scale, said key lens, hairs, lamp and sliding contact being mounted on said slide and movable therewith.

In testimony whereof I have signed my name.

GUST. von POST.